United States Patent [19]

MacCracken

[11] 4,286,141
[45] Aug. 25, 1981

[54] THERMAL STORAGE METHOD AND SYSTEM UTILIZING AN ANHYDROUS SODIUM SULFATE PEBBLE BED PROVIDING HIGH-TEMPERATURE CAPABILITY

[75] Inventor: Calvin D. MacCracken, Englewood, N.J.

[73] Assignee: Calmac Manufacturing Corporation, Englewood, N.J.

[21] Appl. No.: 918,159

[22] Filed: Jun. 22, 1978

[51] Int. Cl.³ .............................. F24H 7/04; H05B 1/00
[52] U.S. Cl. ...................................... 219/365; 60/659; 60/652; 165/104.17; 219/378
[58] Field of Search .................... 60/659, 652; 252/70, 252/71; 165/DIG. 4, 104 S; 126/400; 219/530, 341, 378, 364, 365

[56] References Cited

U.S. PATENT DOCUMENTS

| | | | |
|---|---|---|---|
| 2,856,506 | 10/1958 | Telkes | 252/71 |
| 3,080,706 | 3/1963 | Flynn | 60/659 |
| 3,369,541 | 2/1968 | Thomason | 165/104 S |
| 3,681,920 | 8/1972 | Margen | 60/652 |
| 3,848,416 | 11/1974 | Bundy | 60/652 X |
| 3,981,151 | 9/1976 | St. Clair | 60/659 |
| 4,091,622 | 5/1978 | Marchesi | 60/659 X |
| 4,117,882 | 10/1978 | Shurcliff | 252/70 X |
| 4,150,547 | 4/1979 | Hobson | 165/104 S |

FOREIGN PATENT DOCUMENTS

| | | | |
|---|---|---|---|
| 3312 | 7/1930 | Australia | 252/70 |
| 527118 | 7/1956 | Canada | 252/70 |
| 2417220 | 11/1975 | Fed. Rep. of Germany | 165/104 S |
| 14486 | of 1900 | United Kingdom | 165/104 S |

*Primary Examiner*—Allen M. Ostrager
*Attorney, Agent, or Firm*—Parmelee, Johnson, Bollinger & Bramblett

[57] ABSTRACT

Anhydrous sodium sulfate has been shown to have higher thermal content than any other low cost solid material because of its high density, high specific heat, and additional reversible latent heat of solid-to-solid crystal phase change at around 465° F. By compressing anhydrous sodium sulfate into pellets and then forming a bed of these pellets and passing a heated fluid through the bed a relatively great quantity of heat energy may be economically stored in a relatively small volume. Moreover, a rapid rate of heat transfer into or out of the pebble bed can be achieved, up to 400,000 Btu per hour per cubic foot. The same heat transfer fluid may be used to withdraw the heat from the bed for use in space heating or other purposes. The fluid may be air, other inert gases, or a non-acqueous heat transfer liquid which does not react with sodium sulfate, such as a modified terphenyl or a high temperature oil. Advantageously, a thermal storage system embodying this invention can store a relatively great quantity of heat energy per unit volume, for example up to at least 45,000 Btu per cubic foot in a pebble bed containing thirty percent voids, and even higher when the pebbles are smaller and the percentage of voids is lower. This amount of stored heat energy per unit volume with rapid charging and discharging rates is considerably greater than in any practicable arrangement heretofore proposed.

7 Claims, 7 Drawing Figures

THERMAL STORAGE METHOD AND SYSTEM UTILIZING AN ANHYDROUS SODIUM SULFATE PEBBLE BED PROVIDING HIGH-TEMPERATURE CAPABILITY

BACKGROUND OF THE INVENTION

The storage of heat in compact inexpensive form is becoming more and more necessary both in the utilization of solar energy and in the leveling of electrical daily peak loads. While much of this interest is focused on low or medium temperature storage where rocks, water tanks or the latent heat of fusion of salt hydrates may be used, there is also a need for high temperature storage, for example such as in the generation of electricity by thermal processes from the heat of the sun by focussing reflectors, for heat energy storage for use with fossil-fueled power boilers to generate steam during peak periods, and in the use of electric resistance heat for off-peak space heating, and other applications as will be explained further below.

In Europe there has been great success in the use of magnesite brick (magnesium carbonate) in off-peak space heating using individual room heaters, but magnesite brick has been too expensive for larger uses, and the relatively large bricks are slow to heat and cool due to poor heat transfer, thereby limiting the rate at which heat can be stored and withdrawn in practical equipment. These multiple heaters are inherently expensive.

The use of anhydrous sodium sulfate salt compressed to high density in bars, slabs or bricks was disclosed in my U.S. Pat. No. 2,949,679. Aluminum foil was used by me to wrap the bars both to provide heat transfer and to prevent dusting and crumbling of the sodium sulfate bars. Later it was found that an explosive situation may occur if the aluminum foil should melt when touching the hot salt, the aluminum foil having a melting point at approximately 1200° F.

As explained in the above patent, sodium sulfate exhibits dimorphism and has a very high sensible heat content as well as a dimorphic latent heat of crystal phase transformation at about 460°-470° F. However, in addition to the latent heat, the apparatus described in that patent only used the sensible heat of the aluminum-foil-wrapped bars, slabs or bricks up to about 500°-600° F.

As will be explained further below, the present invention enables the high specific heat and latent heat of anhydrous sodium sulfate salt to be utilized practicably up to a temperature level nearing the salts melting point which occurs above 1600° F.

When compared with magnesite brick the total heat content per cubic foot of solid sodium sulfate is twenty-five percent greater up to the usual magnesite brick practical maximum temperature of 1500° F., and the cost of anhydrous sodium sulfate is one-quarter of magnesite or even less for by-product impure sodium sulfate, such as chrome cake, a by-product of chromium manufacture. In the range of 400° to 600° F. the heat content is seventy-two percent greater when compared to magnesite brick and about twenty-three percent greater compared to rock.

SUMMARY OF THE INVENTION

It is proposed to solve the problems of heat transfer and crumbling of anhydrous sodium sulfate by pelletizing it and then accumulating the pellets into beds through which a fluid heat transfer medium is recirculated. The fluid is heated outside of the bed during the period that the pellet bed is being charged with heat, and heat is withdrawn from the fluid during the period that the pellet bed is being cooled.

The smaller the size of the pellets the more surface area is presented between the anhydrous sodium sulfate salt and the fluid, but also the more pressure drop is encountered in circulating the heat transfer fluid through the voids between the smaller pellets. Heat transfer is faster for smaller pebbles because the total surface area of the numerous smaller pebbles in the bed is larger and also the distance through the salt in each pebble that the heat has to travel is less.

If the above fluid is a gas, such as air, larger size pebbles are more practical to reduce the pressure drop. However, if the fluid is a liquid, the pebbles may be smaller. The void space in a pebble bed varies with the shape of the pebbles, but around twenty percent to forty percent void is a usual range which I have found to be advantageous.

I have found that high temperature, non-acqueous heat transfer fluids in general are chemically inactive when in contact with anhydrous sodium sulfate. In particular Therminol 66, a modified organic terphenyl made by Monsanto Chemical Company is inert with this salt up to 600° F. as is the lower cost Caloria HT-43 highly refined oil made by Exxon Company. Both of these liquids have practical temperature limits of about 600° F. Higher temperature liquids are under development.

In such a recirculating high temperature system the recirculating means, either blower or pump, and the heater means, boiler or electric resistance heater, must be designed with suitable practical precautions to handle the high temperatures involved. Liquids at 600° F. must not be allowed to leak and so special fittings must be used. Air at 1500° F. requires stainless steel containment and blower associated with low watt density, high velocity heater elements.

The suitable practical precautions which should be taken are set forth in a publication *Therminol Fluid Heat Systems* by Monsanto Chemical Company.

However, thermal storage of more than 18,000 Btu's per cubic foot up to 600° F. and more than 45,000 Btu's per cubic foot up to 1500° F. can be achieved in a pebble bed having approximately thirty percent voids by volume and ninety-five percent of theoretical density with very low material costs, the storage per cubic foot per dollar being far better than for other known systems. Theoretical density refers to solid sodium sulfate.

A further advantage is that with very small pebbles a rapid heat transfer rate as high as 400,000 Btu's per cubic foot per hour is achievable. This high rate of heat transfer per unit volume permits heat to be drawn from storage in a solar power plant to generate steam when a cloud goes over the sun almost without power drop or it allows a steam-powered vehicle running from stored heat to refill at a heat filling station in a reasonable time by recirculation a hot fluid such as air through the pebble bed.

DESCRIPTION OF PREFERRED EMBODIMENTS

Figure 1:
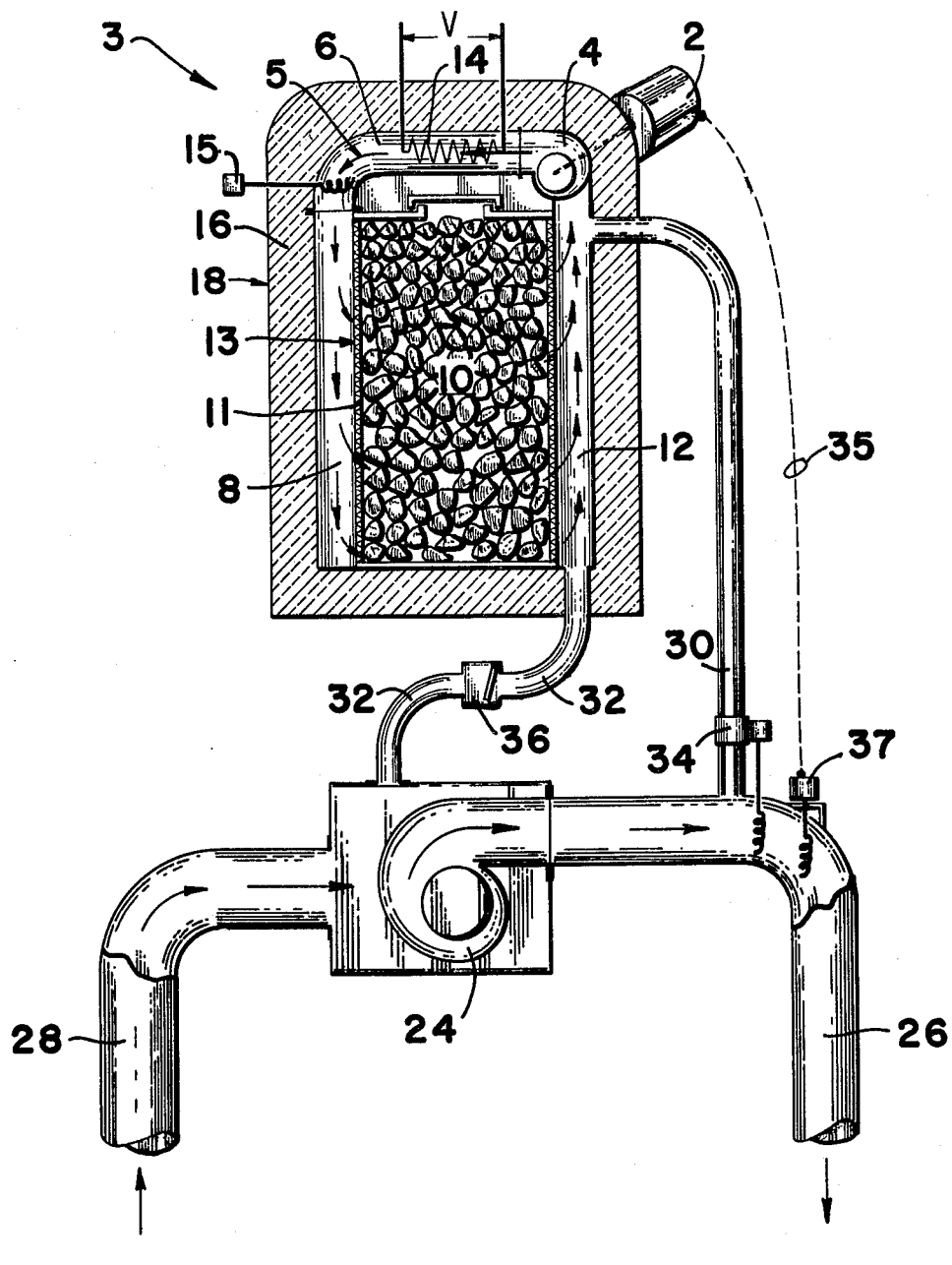
FIG. 1 is a cross-sectional view of a thermal storage unit embodying this invention, the unit being shown connected to hot air distribution system.

In FIG. 1 an electric motor 2 drives a high temperature blower 4 which recirculates air shown by arrows 5 through air ducts 6, 8, and 12 and through pebble bed 10 back to blower 4. Pebbles in pebble bed 10 are kept in place while air is permitted to flow through the bed by a large container 13 having perforated retaining walls 11. These perforated walls may advantageously be formed of stainless steel screen, perforated stainless sheet or expanded stainless sheet. An electric resistance duct heater 14 heats the recirculated air during a thermal charging cycle to a maximum temperature of approximately 1200° to 1500° F., controlled by a high-limit thermostat 15 which senses the temperature of the air downstream from the resistance heater 14.

The heat storage unit 3 includes a sheathing of high-temperature insulation 16, for example such as lightweight ceramic bricks, bats, mats, or a layer of rigid or flexible high temperature fiber material. Such insulation 16 may comprise refractory material and can be obtained commercially under the designation Kaowool or Cerafelt. There is an outer protective housing 18 surrounding the insulation 16 and which may be formed of sheet steel.

When heat is desired for the space heating system for which the pebble bed 10 is storing heat, a central heating blower 24 recirculates air from the living space 27 through duct 28 and returning through duct 26 to the living space being heated. Also some of this recirculated air is recirculated by the same blower 24 through a smaller duct 30 passing through storage unit duct 12 and returning to blower 24 through a duct 32. A thermostatically controlled valve 34 in the duct 30 closes if the air in the duct 26 leading to the space 27 becomes too hot for comfort and safety purposes, thus reducing heat input to the space being heated. A non-return check valve 36 prevents air flow into the duct 32 from the duct 28 or from the blower 24 when this blower 24 is off.

When acting to heat the living space 27, motor 2 and blower 4 may or may not be needed to provide enough heat from the pebble bed. If enough heat flow from the pebble bed is not obtained by natural convection, conduction, or radiation into the duct 12, then the blower 4 will be operated by an electrical circuit 35 extending from the thermostatic switch 37 to the motor 2.

Figure 1A:
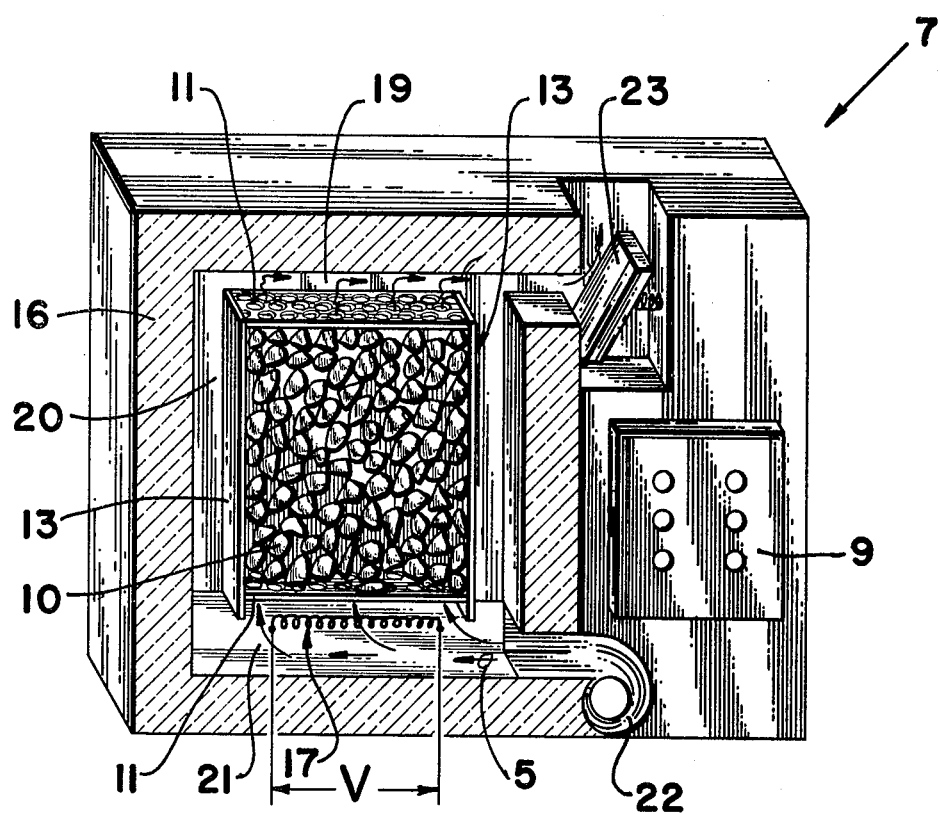
FIG. 1A shows a cross-sectional view of a thermal storage unit in which air heated by an electric heater rises by thermogravitational flow through the pebble bed.

FIG. 1A shows a simpler version of FIG. 1 in which air 5 heated by electric heater 17 rises by thermogravitation through pebble bed 10 heating the pebbles and being cooled by them, said cooler air sinking by thermogravitation down through passages 19, 20 and 21 where it passes again up through the heater 17, thus giving complete air recirculation as the bed 10 is heated.

The walls of passages 19, 20 and 21 are lined with insulation 16 to reduce heat loss. Pebble bed 10 is contained by stainless steel container walls 13 and perforated retaining walls 11. A blower 22 may be operated when heat is desired for space heating delivering ambient air into passageways 19, 20 and 21 and bed 10. The air pressure created by operation of blower 22 opens spring mounted damper 23 allowing hot air to escape to the space to be heated.

The storage unit device 7 shown in FIG. 1A may be conveniently used as an off-peak room heater with full electrical timing controls and thermostats mounted in control box 9 to provide for charging with heat during the low-rate off-peak hours and turning off the heater when the pebble bed approaches a temperature of 1200° to 1500° F. Multiple units may be installed in a building so that one unit takes care of each room.

Alternatively device 7 may be built large enough to heat an entire building and be connected into a central duct system as shown in FIG. 1. The main difference is that storage unit 7 does not require a blower during the heat charging period to recirculate the air.

Figure 2:
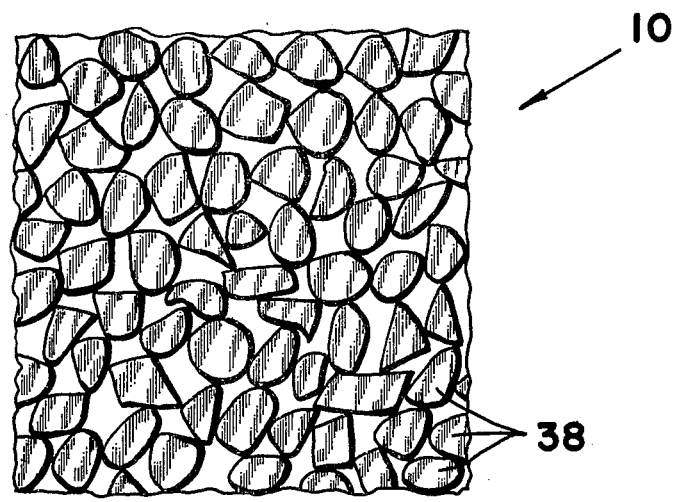
FIG. 2 is an enlarged cross-sectional view of a portion of a pebble bed including irregular shaped pebbles shaped in appearance much like crushed rock, being a section taken in line 2—2 in FIG. 1.

FIG. 2 shows an enlarged cross-section of the pebble bed 10 made up of individual irregularly shaped pebbles 38. These pebbles may be compressed pellets, fractured parts of compressed bars or rods, or other shapes of compressed anhydrous sodium sulfate.

Figure 3:
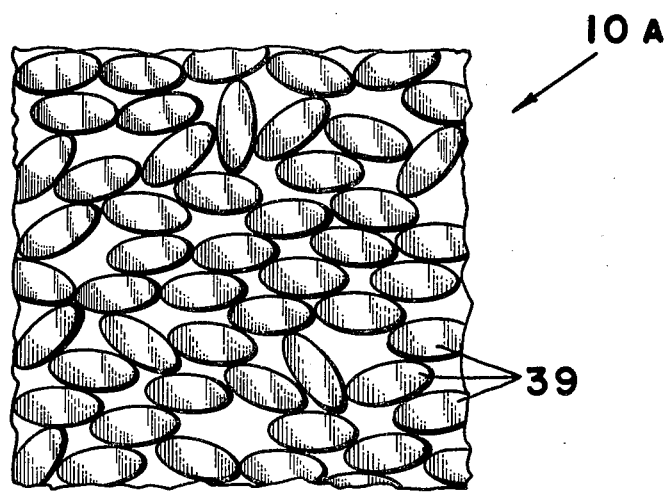
FIG. 3 is an enlarged cross sectional view similar to FIG. 2 and showing a pebble bed in which the pebbles are regularly shaped, appearing much like a large group of pills nestled together.

FIG. 3 shows another suitable pebble bed 10A in which the individual pebbles 39 are all more or less similarly and regularly shaped, appearing much like a large group of pills nested together.

Figure 4:
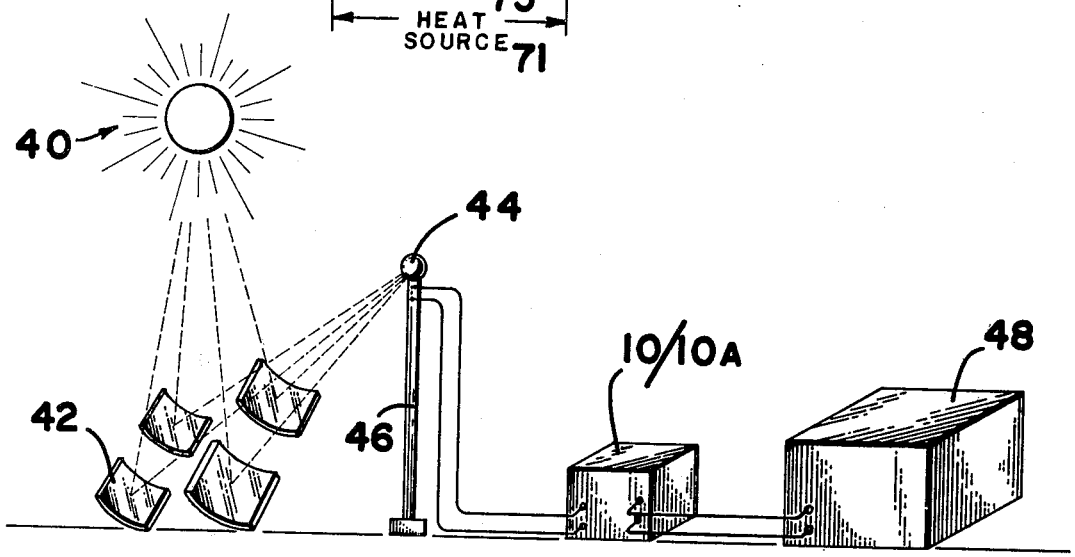
FIG. 4 is a schematic illustration of a solar high temperature collection system.

The heat transfer fluid that flows through the void spaces between the pellets may be air 5 or a high temperature non-acqueous heat transfer liquid 52, as previously described. FIG. 4 shows a high-temperature capability heat storage system in which such a high temperature non-acqueous heat transfer liquid 52 is used, as will be explained further below.

Among the advantages of such pebble beds 10 or 10A is that the irregularity of the flow paths increases the rate of heat transfer to and from the pellets 38 or 39 as compared to conventional exchange equipment having tubes, ducts or fins.

FIG. 4 shows how heat at high temperature may be collected from the sun 40 by an array of parabolic or spherical reflecting tracking mirrors 42 focussing the sun's rays onto a radiant heat exchanger 44 located atop a tower 46 as is being done experimentally in the southwestern United States at this time. Such heat is desired for creating super-heated steam to operate turbines and generators for electric power. Storage of this heat, however, is needed both to adjust for variations in solar insolation and to meet varying electrical load requirements. For example, in partly cloudy weather the generating plant should run continuously, not intermittently, and in summer evenings the air conditioning load should be supplied with electrical power until well after sunset.

To accomplish this storage economically, a fluid is heated in a radiant heat exchanger 44 at the top of the tower. This fluid may be either liquid or air. This same heated fluid is then conventionally pumped directly to a combination steam generator-turbine-electric generator unit 48 as required. In such a solar steam generating system as shown in FIG. 4 the fluid used may be a high temperature non-acqueous heat transfer liquid 52 which is heated in the radiant heat exchanger 44. Then this heated liquid is used as a source of heat to generate steam in the generator unit 48. If desired, the heated liquid may be temporarily stored in a large liquid reservoir for storage of heat.

An improved system for storing this heat is shown in FIG. 4 in which a pebble bed 10 or 10A is used. The pebble bed storage unit 10 or 10A may be incorporated into a system similar to that shown in FIG. 1 if air is used, or if liquid is used, it may be incorporated into a system as shown in FIG. 5.

Figure 5:
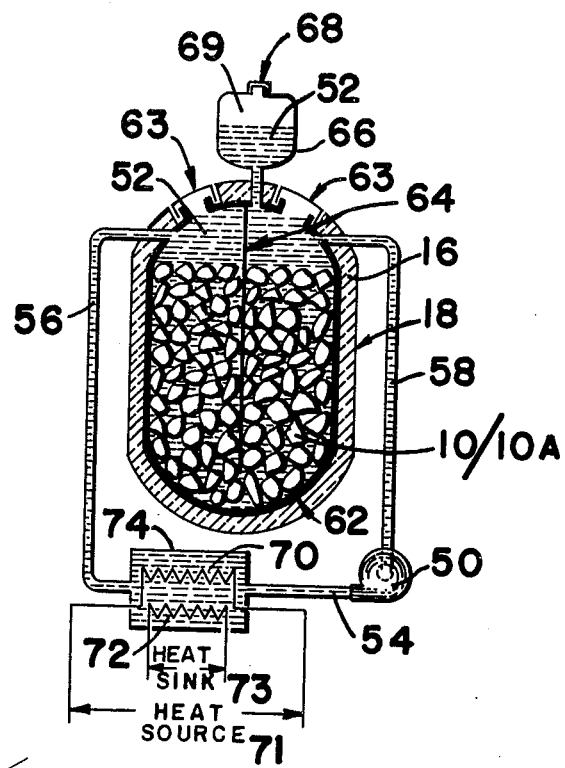
FIG. 5 is a schematic and cross-sectional view of a liquid transfer pebble bed system.

As shown in FIG. 5, a pump 50 recirculates the high temperature liquid 52 as previously identified through pipes 54 and 56 and through a pebble bed 10 or 10A in a tank 62 having an access port 63 and returning to pump 50 through a pipe 58. In order to have a longer path through the pebble bed for better heat transfer and to more conveniently contain the heavy pellets in a tank, a U-bend reversing path is provided by flowing around a baffle 64 dividing the tank in half, with a pathway connecting the two halves at the bottom. Multiple alternating baffles could of course be used to the same advantage for providing a series of U-bend flow-reversing paths. A thermal expansion tank 66 with a filling port 68 is shown. A space 69 above the liquid 52 in this expansion tank 66 is charged with an oxygen-free gas, such as nitrogen to prevent oxidation of the liquid 52.

The tank 62 may be sheathed in an insulation layer 16 similar to that as described above in connection with FIG. 1 and having an outer housing 18 of sheet metal. The access port 63 in the tank 62 is hermetically sealed for preventing the entry of ambient air into this container to avoid oxidation of the liquid 52.

A heat exchange unit 74 is located between pipes 54 and 56. This unit 74 is shown as including heat transfer apparatus 70 which is supplied with heat energy from a heat source 71. Also shown as included in the unit 74 is heat transfer apparatus 72 which can extract heat energy to be fed into a heat sink 73. As shown in FIG. 4 the heat source 71 may be the radiant heat of the sun 40 and the heat sink 73 may be water in the generator unit 48 flashing to steam. In such a case, there are suitable connections, as will be understood, for feeding the heated heat transfer liquid from the radiant heat exchanger 44 into the heat transfer apparatus 70, and also for feeding the water to be flashed into steam into the other heat transfer apparatus 72.

Alternatively, the heat source 71 may be a fossil-fuel burning plant carrying out the combustion of fossil fuel, and the heat sink 73 may be water in the generator unit 48 being flashed into steam the same as in FIG. 4 for the purpose of providing peak load reserve capacity when needed and for enabling the required burning rate of coal fires in boilers to be advantageously evened out.

GENERAL DISCUSSION

The maximum temperature to which the anhydrous sodium sulfate salt pebbles may be heated is to just below their melting point, which is 1623° F. If the melting point is exceeded not only would the pebble bed be destroyed, but the molten liquid salt is extremely corrosive and dangerous. Therefore, a practical safe limit is about 1500° F., and multiple controls should be used to be sure this temperature limit is not exceeded.

In a fossil fuel power plant application clean combustion gases, not exceeding 1500° F., may be run directly through the pebble bed 10 or 10A for storing the heat. Then air is run through the same bed, at a different time, when the combustion gases are not going through, to transfer the stored heat energy to a heat exchange boiler for flashing steam for reheating purposes after a temporary shut down.

The pebbles themselves may be of various sizes from very small sand-like particles to pill-shaped pellets to gravel and rock-like pellets; for example, these pebbles 38 or 39 may be in a size range of approximately 3/32 of an inch in diameter, such as small spherical pellets or irregular granular or sand-like particulates up to much larger sizes over an inch or two in diameter, similar in size and shape to gravel or crushed rock. Their shape may be regular or fragmented. Generally the smaller their size the higher the pressure drop of the heat transfer fluid pumped through the bed 10 or 10A and the lower the void percentage. Regular geometric shapes having parallel sides such as cylinders may block off air flow and cause inefficient heat transfer. The particular pebble shape and size depends upon the application, but generally crushed bars and fragments screened for certain mesh sizes and also regular pellets of generally oblate spheroidal or pill shape are preferred and are arranged in the bed 10 or 10A for providing a void percentage lying in the range from approximately twenty percent to approximately fifty percent.

Anhydrous sodium sulfate is obtained in sand size or smaller particles and is not easy to compress or pack into strong, high density pebbles. Dry compression will achieve only seventy or seventy-five percent density; and dry compression results in powdery, crumbly fragments which cannot be handled conveniently. I have discovered a high-speed pelletizing process which may be used for achieving strong pellets having a density above eighty percent extending up to ninety-five percent density by first warming the salt to a temperature of over 100° F., and then ading a small amount of moisture, less than one percent by weight of evenly distributed water. This small percentage of water advantageously acts as a lubricant and will squeeze out and dry during and after the pelletizing process, thereby forming strong symmetrical pill-like pellets of up to ninety-five percent density.

In this high-speed pelletizing process a very minor amount of moisture not exceeding three percent by weight is evenly distributed into the salt particles by applying a fine mist or very high humidity environment for uniformly moistening these particles. Then, the moistened salt particles are introduced into the nip region between a pair of opposed revolving pellet-forming drums having the same peripheral speed with aligned recesses or die surfaces in their peripheries which serve to compact the moistened salt particles into strong pill-like pellets. These revolving drums may advantageously run at a temperature of 160° F. to 180° F. which aids in drying the pellets being formed. The resultant pellets are sufficiently strong that they can be handled as by use of a shovel without crumbling. They have a density above eighty percent and extending up to ninety-five percent.

By this term density expressed in percentage I mean that individual ones of these pellets have a density which is above eighty percent and extends up to ninety-five percent of the density of a solid non-porous mass of anhydrous sodium sulfate.

Figure 6:
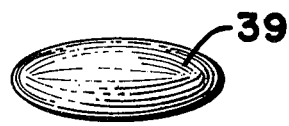
FIG. 6 is an enlarged view shown at twice actual size of a compressed anhydrous sodium sulfate salt pellet which works to advantage in a pebble bed.

These pellets may advantageously have a generally oblate spheroidal configuration with a generally oval or elliptical cross sectional shape such as an almond shape with their major dimension lying in the range from ¼ inch to 2 inches. In FIG. 6 is shown a drawing at a scale of twice actual size of a symmetrical almond-shaped pellet 39 having a generally elliptical pill shape which I have found to work to advantage for forming a pebble bed 10A. Its dimensions are approximately 1 inch long by ¾ inch wide by ½ inch high.

The total amount of heat contained by the anhydrous sodium sulfate salt versus temperature is shown in a curve presented in a paper by Messrs. Arun Verma, Keith Johnson, and E. O. Sherman published in The Canadian Journal of Chemical Engineering, Vol. 54, August 1976. While the heat stored per unit volume in anhydrous sodium sulfate is far greater as you go higher in temperature, I have also found that anhydrous sodium sulfate pellets in a bed have an advantage over a group of ordinary rocks or gravel for low temperature storage (under 160° F.) in solar space heating. This advantage results from the hygroscopic nature of the salt which causes it to pick up moisture and thereby will prevent the formation of mildew, which is a commonly encountered problem in the use of ordinary rock and gravel heat storage beds. Mildew in the rock or gravel bed generates an unpleasant dank odor which permeates the heated living space and is very difficult to remove.

The crystal structure of the salt changes from form III to form I at around 466° F. with no noticeable change in appearance or volume. A latent heat due to this crystal phase change adds to the overall high specific heat and high density to provide the high heat energy storage capability per unit volume.

A pebble bed comprised of pellets having a generally almond shape approximately 1 inch long by ¾ths of an inch wide by approximately ½ inch thick, with each pellet having a density of more than ninety percent up to approximately ninety-five percent, were arranged in a pebble bed having interconnecting voids among the pellets comprising approximately thirty-five to forty-five percent of the bulk volume of the pebble bed. At a bed temperature up to 600° F. more than 18,000 Btu's of heat energy were stored per cubic foot of bulk volume of the bed.

While it is anticipated that the pellets will be strong enough to resist erosion, powdering or crumbling over long term because of their high density resulting from this pelletizing process, a thin coating of compatible protective material such as water glass, i.e. liquid sodium silicate, may be used to cover the pellets. This water glass coating may be applied to the pellets as a clear liquid to prevent erosion, powdering or crumbling action. If the anhydrous sodium sulfate is pressed into large sizes, such as in slabs or bricks, as is the custom with magnesite, then such a protective coating may be required, because of the higher bending moments arising in handling slabs or bricks and their higher weight to tensile strength ratios.

Smaller size pellets will transfer heat faster than large ones as previously stated. With particle sizes on the order of ⅛ inch to ¼ inch and using a liquid transfer fluid or gas at higher velocity, heat can be transferred very rapidly. I propose that a steam-driven automotive transportation vehicle be constructed with such a high-temperature anhydrous sodium sulfate salt pebble bed 10 or 10A in the vehicle as a heat source for generating the steam. Air may be used as the heat transfer fluid for transferring the heat energy from the pebble bed into heat exchange type boiler for generating steam to be used in a steam engine for propelling the vehicle. Such a pebble bed in a vehicle can be charged with heat at a refill station in a matter of minutes by the recirculation of a hot fluid heated at the station and pumped through the pebble bed in the vehicle.

Other advantageous uses for such salt pebble beds include storage of waste heat from boiler flue gases or from kilns. Clean waste exhaust gas or heated air can be run through the pebble bed to store the heat. Then by changing flow controls or dampers, a fresh air stream can later be run through the heated pebble bed perhaps in the opposite direction for preheating a boiler or a kiln or for performing drying or other supplemental heat functions, such as heating water or generating steam. Several storage bed units can be alternately, if desired, for increasing the overall heat storage capacity or for enabling heat to be stored in one bed while heat is being withdrawn simultaneously from another bed.

I claim:

1. A thermal storage unit for use in heating living space comprising:

a high temperature resistant container having a bottom with multiple openings therein, a pebble bed within said container supported by said bottom, said pebble bed having interconnecting voids among the pebbles in said bed, said pebbles being formed of compressed anhydrous sodium sulfate particles, said high temperature resistant container being arranged to permit air flow to pass upwardly through said openings in said bottom and upwardly through the interconnecting voids in said pebble bed, thermally insulated walls surrounding said pebble bed container and said storage unit being arranged for permitting air flow to return downwardly from the top to the bottom of said container, an electrical resistance heater element mounted within said insulated walls and positioned below said pebble bed container for causing, when heated, thermogravitational circulation of air to occur passing upwardly through said openings and through said interconnecting voids and returning downwardly for transferring heat energy from said heater element into said pebble bed, said pebble bed storing between 11,000 and 22,000 Btu's of heat energy per cubic foot of said pebble bed at a bed temperature up to 600° F. and being capable of storing between 28,000 and 56,000 Btu's of heat energy per cubic foot of said pebble bed at a bed temperature up to 1,200° to 1,500° F., said insulated walls having an inlet and an outlet for permitting air to flow from the living space to and from said pebble bed, said inlet communicating with the openings in the bottom of said pebble bed container and said outlet communicating with an outflow from said pebble bed container, a blower associated with said inlet for blowing said from said inlet from the living space into communication with the bottom of said pebble bed container for heating the air, with the heated air flowing through said outlet for returning into the living space, and movable damper means operatively associated with said blower for controlling the operation.

2. A thermal storage unit for use in heating living space, as claimed in claim 1, in which:

said pebbles are pellets having their major dimension lying in a size range from ⅛ of an inch to 2 inches.

3. A thermal storage unit for use in heating living space, as claimed in claim 2, in which:
said pellets are shaped without parallel sides for avoiding the blocking of air flow through the interconnecting voids in said pebble bed.

4. A thermal storage unit for use in heating living space, as claimed in claim 3, in which:
said pellets have a generally oblate spheroidal configuration with a generally oval cross-sectional shape.

5. A thermal storage unit for use in heating living space, as claimed in claim 1, 2, 3 or 4, in which:
said pellets are compacted from particles of anhydrous sodium sulfate and have a density above eighty percent of the density of a solid non-porous mass of anhydrous sodium sulfate.

6. A thermal storage unit for use in heating living space, as claimed in claim 1, 2, 3 or 4, in which:
said pellets are compacted from particles of anhydrous sodium sulfate,
have a density above eighty percent of the density of solid non-porous mass of anhydrous sodium sulfate, and are coated with sodium silicate.

7. A thermal storage unit for use in heating living space comprising:
a high temperature resistant container having a bottom with multiple openings therein,
a pebble bed within said container supported by said bottom,
said pebble bed having interconnecting voids among the pebbles in said bed,
said pebbles being formed of compressed anhydrous sodium sulfate particles,
said high temperature resistant container being arranged to permit air flow to pass upwardly through said openings in said bottom and upwardly through the interconnecting voids in said pebble bed,
thermally insulated walls surrounding said pebble bed container and said storage unit being arranged for permitting air flow to return downwardly from the top to the bottom of said container,
electrical resistance heater means mounted within said insulated walls and positioned in heat exchange relation with said pebble bed for causing, when heated, thermogravitational circulation of air to occur passing upwardly through said interconnecting voids and returning downwardly for transferring heat energy from said heater means into said pebble bed,
said pebble bed storing between 11,000 and 22,000 Btu's of heat energy per cubic foot of said pebble bed at a bed temperature up to 600° F. and being capable of storing between 28,000 and 56,000 Btu's of heat energy per cubic foot of said pebble bed at a bed temperature up to 1,200° to 1,500° F.,
said insulated walls having an inlet and an outlet for permitting air to flow to and from said pebble bed,
said inlet communicating with the openings in the bottom of said pebble bed container and said outlet communicating with an outflow from said pebble bed container,
a blower associated with said inlet for blowing air from said inlet into communication with the bottom of said pebble bed container for heating the air, with the heated air flowing through said outlet for returning into the living space, and
air flow control means operatively associated with said blower for controlling the operation.

* * * * *